C. Shelmidine. Shingle Edger.
116637     Fig. 1.     PATENTED JUL 4 1871
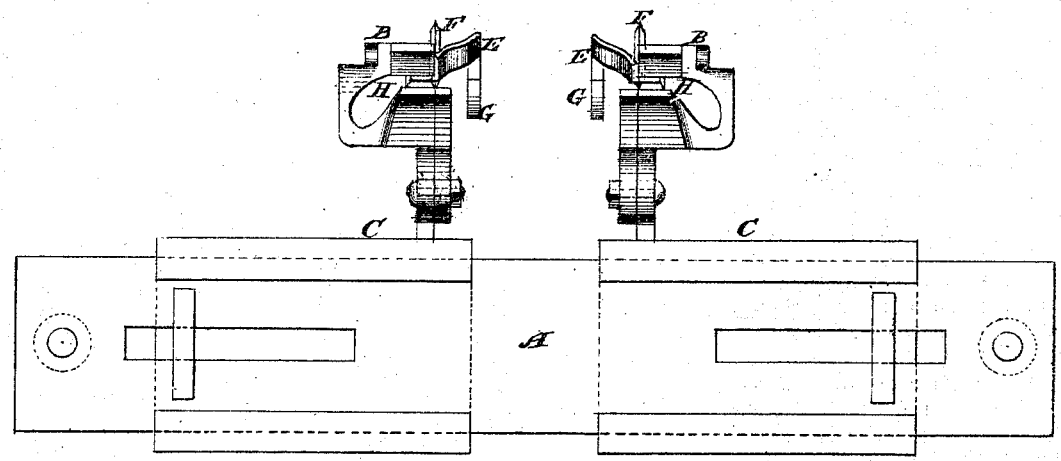
Fig. 2.
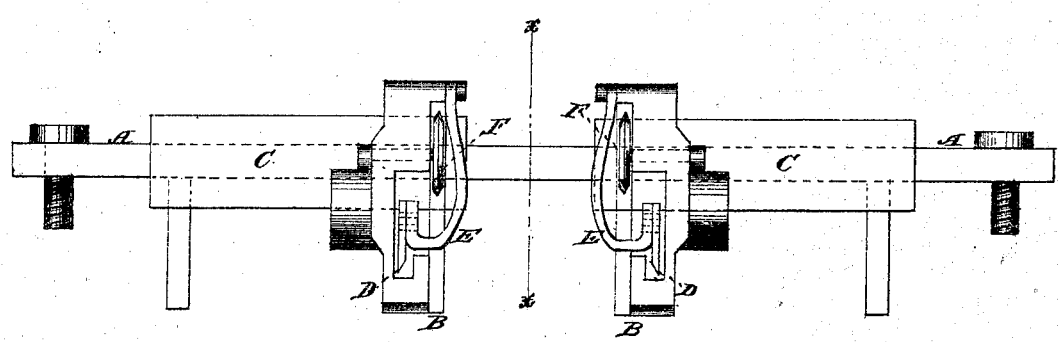
Fig. 3.
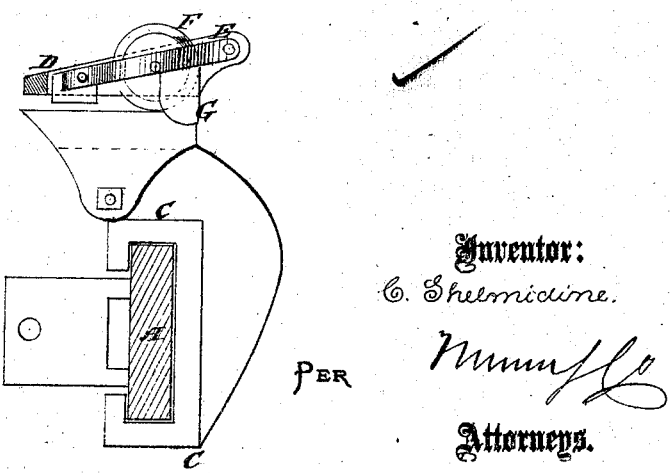
Witnesses:
P. C. Dieterich
Wm. H. C. Smith
Inventor:
C. Shelmidine
per
Attorneys.

UNITED STATES PATENT OFFICE.

CHARLES SHELMIDINE, OF SUMMIT, NEW YORK.

IMPROVEMENT IN SHINGLE-MACHINES.

Specification forming part of Letters Patent No. 116,637, dated July 4, 1871.

*To all whom it may concern:*

Be it known that I, CHARLES SHELMIDINE, of Summit, in the county of Schoharie and State of New York, have invented a new and useful Improvement in Shingle-Edger; and I do hereby declare that the following is a full, clear, and exact description thereof, which will enable others skilled in the art to make and use the same, reference being had to the accompanying drawing forming part of this specification.

This invention relates to a new and useful improvement in an attachment to shingle-machines for gauging and edging shingles; and consists in two jaws sliding on a stationary bar, with gauging-knives and circular edging-cutters, arranged to operate as hereinafter described.

In the accompanying drawing, Figure 1 represents a front view, and Fig. 2 a top or plan of the edger. Fig. 3 is a vertical section taken on the line $x\ x$.

Similar letters of reference indicate corresponding parts.

A is the stationary bar, by means of which the edger is attached to the shingle-machine. B B are two jaws, which are made to slide back and forth on the bar A. The manner in which they are connected with the bar is seen in Fig. 3. The slides C C, to which the jaws are directly attached, are so operated upon by springs that the jaws are adjusted so as to suit the width of the shingle. The edging-levers may be on the outside of the shingle-machine, connected together by coiled springs. The shingle passes between the jaws B B and strikes against the inside of the gauge-knives D D, which knives are fastened to the curved pieces E E. F F are circular cutters, which revolve on pivot-pins in the jaws. As the shingle passes back the circular cutters begin to cut when the shingle reaches the incline planes G G, which are on the bottom of the curved pieces E E. As the shingle slides under these incline planes it lifts the gauge-knives D D from the shingle, while the circular knives cut the edges of the shingle and make them straight and parallel with each other. The shingle passes through a groove in each of the jaws when it is operated upon by the knives and cutters. The said grooves terminate in the circular openings H H, as seen in Fig. 1. By these grooves the shingle is confined on both its sides, and kept in the proper position for the edging process to be performed.

The circular cutters cut by the side of flanges on the lower portion of the jaws, so that the bottom side of the shingle passes through the jaws a little above the bottom of the circular cutters.

This apparatus is more especially designed for a shingle-machine for which Letters Patent have already been granted me, and its application will be readily understood by referring to said machine.

Having thus described my invention, I claim as new and desire to secure by Letters Patent—

1. In a shingle-machine, the jaws B B, constructed and arranged to operate as herein shown and described.

2. The combination of the gauging-knives D D and circular cutters F F in the jaws B B, arranged to operate substantially as and for the purposes described.

3. The incline planes G G and curved pieces or levers E E, in combination with the jaws B B, substantially as described.

CHARLES SHELMIDINE.

Witnesses:
SILAS W. DIKEMAN,
LEWIS SHELMIDINE,
BYRON BURNETT.